United States Patent

Lozinski et al.

[11] Patent Number: 6,055,306
[45] Date of Patent: Apr. 25, 2000

[54] SUPPRESSION OF CALL ANSWER SUPERVISION IN A TELEPHONE NETWORK BY AN INTELLIGENT PERIPHERAL

[75] Inventors: Zygmunt Anthony Lozinski, Winchester; David John Prime, Romsey; Andrew Ritchie, Eastleigh, all of United Kingdom

[73] Assignee: International Business Machines Corp., Armonk, N.Y.

[21] Appl. No.: 08/975,905

[22] Filed: Nov. 21, 1997

[30] Foreign Application Priority Data

Mar. 19, 1997 [GB] United Kingdom ................ 9705670

[51] Int. Cl.⁷ .................................................. H04M 7/00
[52] U.S. Cl. .......................... 379/230; 379/115; 379/220; 379/229
[58] Field of Search .................................. 379/111, 114, 379/115, 211, 212, 220, 230, 229

[56] References Cited

U.S. PATENT DOCUMENTS

| | | | |
|---|---|---|---|
| 4,811,378 | 3/1989 | Else et al. ................................. | 379/189 |
| 5,418,844 | 5/1995 | Morrisey et al. ......................... | 379/207 |
| 5,502,759 | 3/1996 | Cheng et al. .......................... | 379/88.02 |
| 5,583,920 | 12/1996 | Wheeler, Jr. .......................... | 379/88.01 |
| 5,600,710 | 2/1997 | Weisser, Jr. et al. ................. | 379/88.19 |
| 5,793,839 | 8/1998 | Farris et al. ............................... | 379/34 |
| 5,892,822 | 4/1999 | Gottlieb et al. .......................... | 379/220 |
| 5,894,511 | 4/1999 | Jordan ...................................... | 379/114 |

FOREIGN PATENT DOCUMENTS

| | | | |
|---|---|---|---|
| WO95/20857 | 8/1995 | WIPO .............................. | H04M 3/42 |
| WO96/13927 | 5/1996 | WIPO .............................. | H04M 3/42 |

*Primary Examiner*—Krista Zele
*Assistant Examiner*—Roland G. Foster
*Attorney, Agent, or Firm*—Jerry W. Herndon

[57] ABSTRACT

This invention relates to an intelligent peripheral (IP) for connecting to a telephone network and providing added capabilities to the network. More particularly the invention relates to programmable suppression of call answer supervision by an intelligent peripheral or a voice recognition unit in a telephone network. The method comprises the steps of: the peripheral device receiving a call setup message from a network switch when a call is being initiated. The IP, on receipt of the call setup signal, suppresses the normal answer signal output and instead outputs a progress signal to the network switch. For an ISDN network the progress signal is a Progress Indicator PI=08 signal.

14 Claims, 3 Drawing Sheets

SUPPRESSION OF CALL ANSWER SUPERVISION IN A TELEPHONE NETWORK BY AN INTELLIGENT PERIPHERAL

FIELD OF INVENTION

This invention relates to an intelligent peripheral (IP) for connecting to a telephone network and providing added capabilities to the network. More particularly the invention relates to programmable suppression of call answer supervision by an intelligent peripheral or a voice recognition unit in a telephone network.

BACKGROUND OF INVENTION

A telephone network is generally formed by a number of interconnecting switches at service switching points (SSP); these provide basic routing for telephone messages and also some other advanced features. One such feature is the capability for playing 'network information' messages to a caller without creating a billing record, for example—'your call is being redirected. Please hold while we reroute your call'. However, switches have a major disadvantage in that it is difficult to record and manage network information or service messages. As such it presents problems for administrators implementing new services. Also switches are not flexible when it comes to the addition of new features or services. The high capacity computers used in a telephony network are well known in the art. See, eg. 'Intelligent Networks Basic Technology, Standards and Evolution' by T. Magedanz et al 1996, International Thomson, incorporated herein by reference.

Network information messages are much easier recorded and managed in an Intelligent Peripheral than in the switches where they have been historically resident. Also Intelligent peripherals have increased flexibility when it comes to the creation of new services or features to the telephone network. The switch transfers the call to the IP (14) so that the message can be played. Before it can be played the IP (14) has to acknowledge to the switch that it has accepted the call by sending an event using a common protocol with the switch. The switch interprets this acknowledgement to mean that the call has been accepted and that a billing record should be created and charged to the caller. This is quite a large restriction for network services.

A typical (ISDN) system comprises an SSP (10), a controller (12) (SCP—service control point) and an IP (14) with an ISDN connection between SSP (10) and IP (14) (see FIG. 1). The controller is typically a computer server having a database with a number directory and instructions for forwarding calls to certain IPs. The controller is connected to the SSP (10) via a Signalling System No.7 (SS7) link and the IP (14) by standard computer links. A telephone (16) is connected to the SSP (10) either by an ISDN Basic rate interface for an ISDN telephone or an analogue connection for a standard telephone. An ISDN telephone is used, as shown in the examples.

A common operation for such a system is a call to an enhanced network service like an 0800 number when the service is not available from telephone (16). The operation proceeds as follows—a setup message is sent from the telephone (16) to the SSP (10) which sends a message back to the caller to indicate that the call is proceeding. At the same time the SSP (10) detects that this is an enhanced service number and sends a connection query to the SCP (12). On receipt the SCP (12) sends a message back to the SSP (10) along with routing information for the particular IP (14) that is to be used for the 'service not available' application. At the same time call information is sent to the IP (14) over the TR1129+ connection from the SCP so that it can prepare for a connection with the SSP (10). The SSP (10) then sends a message to the IP (14) requesting a call be set up. At the IP (14) the 'service not available' application is selected. An AnswerCall action is executed which causes a message to be sent to the SSP (10) to indicate the call is in progress, an optional alert message can be sent to the SSP (10) and then a connect message requesting connection with the SSP (10). On receipt of the connect message from the IP (14) the SSP (10) creates a billing record and along with a connect message to the caller, connects a voice channel between the IP (14) and the caller. Once the voice channel is open the IP (14) plays the voice message to the caller. All this time the billing record is charging for the time that the voice channel is connected. At the end of the voice message the IP (14) ends the call by sending a disconnect message to the SSP (10) which stops charging for the call by closing the billing record and sends a disconnect message to the caller.

There is a need for intelligent peripheral services to be provided that interact with the caller but do not create billing records in the network and therefore do not charge the caller. There is also a need for intelligent peripheral services which have some initial interaction with the customer on a no charge basis, but then move on to a different part of the service and wish to charge the customer.

SUMMARY OF INVENTION

According to one aspect of the invention there is provided a method of suppressing call answer supervision by a peripheral device in a telephone network switch, whereby a billing record for the call is not created, comprising the steps of:

the peripheral device receiving a setup signal from the network switch when the network switch is attempting to place a call; and the peripheral device sending a progress signal to the network switch.

According to a second aspect of the invention there is provided a peripheral device for connection to a telephone network switch in a telephone network comprising:

means for receiving a setup from the telephone network switch when the switch is attempting to place a call; and means for sending a progress signal to the network switch; whereby the network switch will suppress call answer supervision of the peripheral device after receiving the progress signal and thereby not creating a billing record for the call.

This provides the advantage that IPs can be fully integrated with a telephone network and provide voice paths within the network where no billing record is generated. Use of voice channels without a billing record was previously considered the exclusive domain of the switches in a telephone network. The term for this process is 'suppression of call answer supervision'.

Integrated Services Digital Network (ISDN) and Channel Associated Signalling (CAS) on E1/T1 links can be used as the signalling protocols for call setup and clearing between a telephone switch and an IP (14) which can provide Intelligent Network services. These protocols have been designed so that for network information purposes a voice path may be connected between a switch and a caller and no billing record generated.

An operation in an switch where a billing record is not generated is when a called number is ringing or engaged. A caller requests setup of a call to the SSP (10), if the number is ringing or engaged the SSP (10) will open a one way voice channel with the caller and sends a progress message with Progress Indicator Information Element with value 8 (PI= 08) to the caller. No billing record is generated when the switch receiver sends such a progress message. Progress messages of this type are known only to originate from the network switch to an end point device like an IP (14) or ISDN telephone (16) to keep the end point device informed of the progress of the call from the switch. The caller can listen into the channel when the first message is received confirming the channel to be used i.e. CALL PROCEEDING or ALERT and the SSP (10) generates a ringing or engaged tone over the channel. ISDN call progress indication is defined in 3.3.1.9 Bellcore Technical reference TR.NWT.001268 (issue 1, December 1991). The text reads as follows:

If the call is an end to end ISDN speech or 3.1 kHz audio call, the PROGress message contains progress indicator #8, "inband information or appropriate pattern now available" and the called interface subscribes to the "User Provided Audible ring" option. Unless the SPCS (the switch) is returning audible ringing because T303 or T-delay expired, the SPCS(R) shall complete the circuit switched connection only in the direction from the Called Class II equipment to the calling party according to the requirements in LSSGR Section 5.2.2.1D. If the message is received when the call interface does not subscribe to the user-provided audible ring option, the SPCS(R) shall discard the PROGress message.

Although the term 'Intelligent Peripheral' is used throughout the description other units, for instance a voice response unit, connected to a telephone network may be used instead.

TR1129+ is an intelligent network protocol developed by Bell Atlantic Corporation.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
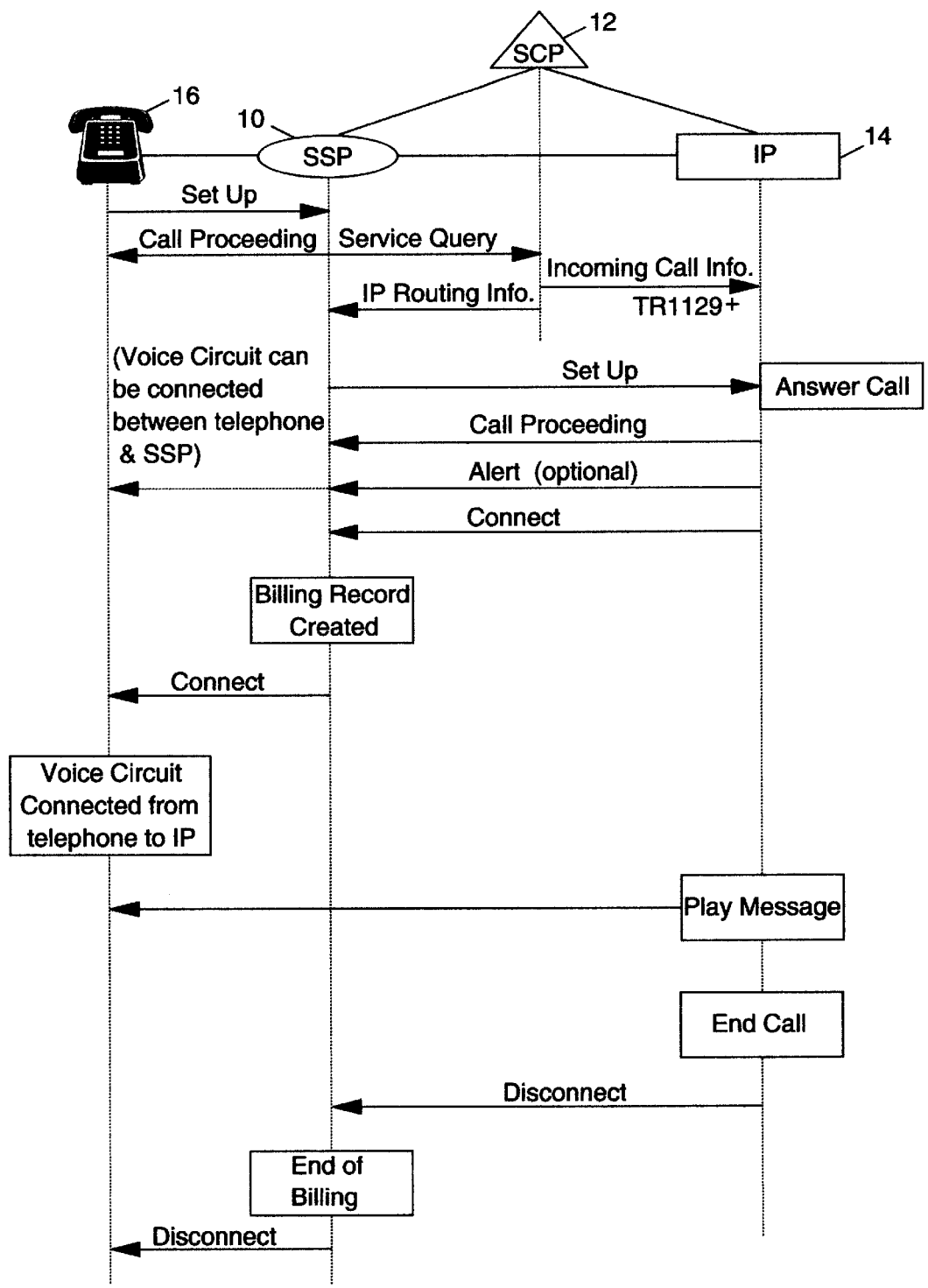
FIG. 1 is a prior art schematic of SSP (10) with intelligent peripheral and timing diagram.
Figure 2:
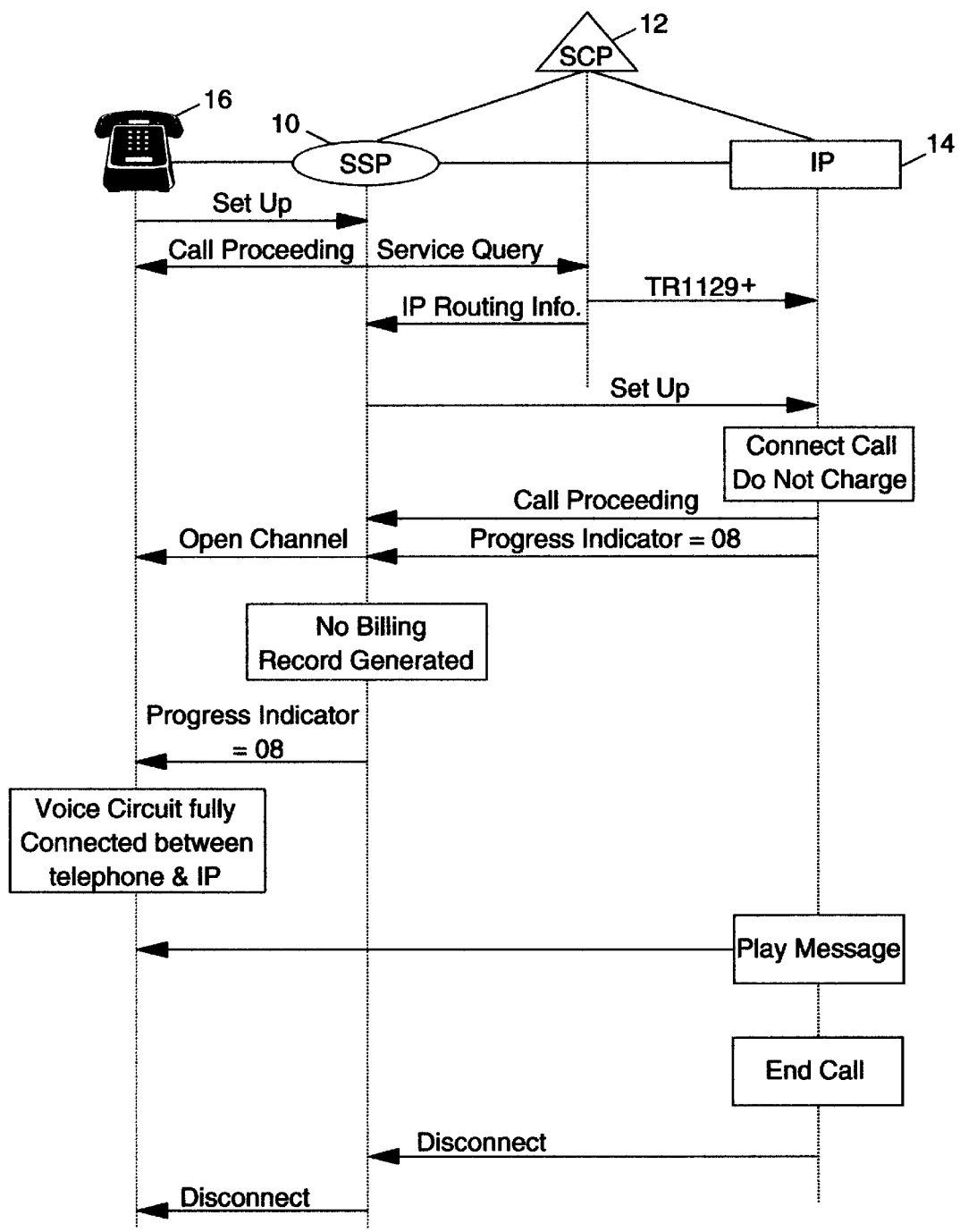
FIG. 2 is a schematic SSP (10) and timing diagram of one embodiment of the present invention.

The ISDN system (as described previously for FIG. 1) comprises, an SSP (10) (service switching point), a SCP (12) (service control point) and an IP (14) (see FIG. 2). The link between the SSP (10) and the IP (14) is an ISDN connection. The link between the SCP (12) and the SSP (10) is an SS7 connection and the link between the SCP (12) and IP (14) is a computer network connection.

The method of this embodiment is described as follows. A user with an ISDN telephone places a call to a enhanced network service number which is not available by sending a 'SetUp' message to the SSP (10). The SSP (10) then sends a 'CallProceeding' message back to the caller to indicate that the call is proceeding. The SSP (10) on detecting it is an enhanced services number then sends a 'Query' message to the SCP (12) for routing information. At this point the voice circuit can be connected between the telephone and the SSP (10). The SCP (12) then sends a message with routing information for the IP (14) to the SSP (10) for connection to the 'service not available' application on the IP (14). At the same time call information is sent to the IP (14) over the TR1129+ connection from the SCP. The SSP (10) sends a 'SetUp' message to the IP (14). From the IP (14), a 'CallProceeding' message is sent to the SSP (10) to indicate the call is in progress and then a 'ProgressIndicator #8' message requesting a no billing connection with the SSP (10). On receipt of the 'ProgressIndicator #8' message the SSP (10) does not create a billing record. If the caller is an ISDN caller it then forwards the 'ProgressIndicator #8' message to the caller and connects a voice channel between the IP (14) and the caller. Once the voice channel is open the IP (14) plays the voice message to the caller. During this time no billing record is created or updated. At the end of the voice message the IP (14) ends the call by sending a 'Disconnect' message to the SSP (10) which sends a 'Disconnect' message to the caller.

In the new method when the IP (14) comes to request connection of a voice channel, instead of using the normal 'Connect' message the IP (14) uses the ISDN Message Progress with Progress Indicator Information Element with value 8 (PI=08). When the SSP (10) receives this message it thinks that the message has been sent by another switch and does not generate a billing record.

Figure 3:
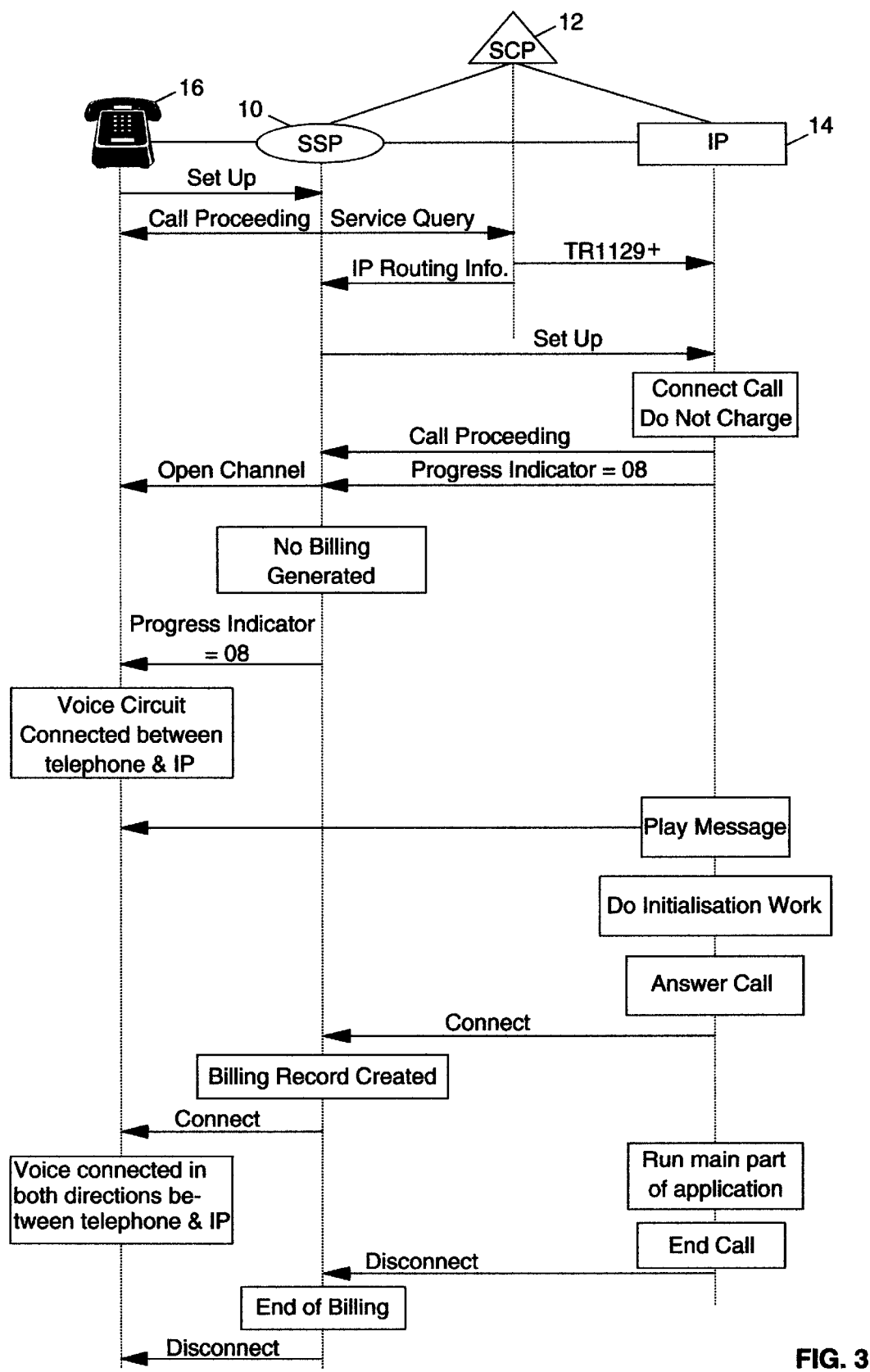
FIG. 3 is a schematic SSP (10) and timing diagram of a second embodiment of the present invention.

A further embodiment is now described (see FIG. 3) where the start of the call is not charged but the remainder of the call is. A user places a call to an 0800 service number that involves a query to a database, for example, to see if the calling number is registered to use that service and where the initialisation of the application may take 5 seconds. A 'SetUp' message is sent to the SSP (10) which then sends a 'CallProceeding' message back to the caller to indicate that the call is proceeding. This is normally sent whenever an SSP (10) receives a 'SetUp' message. Furthermore, after 'CallProceeding' a voice circuit can be connected between the telephone and the SSP (10). The SSP (10) sends a connection 'Query' message to the SCP (12) which returns with a message and routing information for the IP (14). The SCP (12) then sends, as before, a message over the protocol TR1129+ to the IP (14) alerting it to the impending 'SetUp' message. The SSP (10) then sends a 'SetUp' message to the IP (14) requesting the application be initialised and executed. The IP (14) sends a 'CallProceeding' message to the SSP (10) to indicate that the call is in progress and then a Progress message with ProgressIndicator Information Element of value 8 (PI=08) requesting a no billing connection with the SSP (10). On receipt of the 'Progress' message the SSP (10) passes the 'Progress' message with Progress Indicator Information Element of value 8 (PI=08) to the caller and connects a voice channel between the IP (14) and the caller. Once the voice channel is connected the IP (14) plays the voice message to the caller, e.g. 'Please wait while we validate your call. During this time no billing record is created or updated.

Once the initialisation work has been completed successfully and or after a timed delay, the service can be run and the IP (14) sends a 'Connect' message to the SSP (10). The SSP (10) generates a billing record on receipt of the 'Connect' message, opens a full two way voice channel from the IP (14) to the user and sends a further 'Connect' message to the caller. The caller can now assume a 2 way connection and the IP (14) runs the main part of the application. During this time the SSP (10) is billing for the time after the 'Connect' message was received but not for the initialisation time. At the end of the application the IP (14) ends the call and sends a 'Disconnect' message to the SSP (10). On receipt of the 'Disconnect' message the SSP (10) finalises the billing record. The SSP (10) in turn sends a 'Disconnect' message to the caller and the call is ended.

The IP (14) and the switch have divided responsibilities. The IP (14) is responsible for connecting an outbound voice path on the channel which the incoming call is currently on and has its Call Answer Supervision suppressed. The IP (14) is also responsible for connecting a bidirectional voice path on the channel if a full Call Answer Supervision is invoked later.

The switch/SSP is responsible for connecting the incoming voice path on the channel from the IP/VRU to the Caller when it detects that the IP (14) has sent the signalling sequence for Call Answer Supervision Suppression. The switch/SSP is also responsible for connecting a bidirectional voice path on the channel on detecting the full connect signalling sequence from the IP/VRU.

Although this embodiment has been described in terms of the ISDN protocol between the SSP (10) and IP (14), the same functionality could be made available with a CAS protocol if a Signalling transition on the ABCD signalling bits could inform that the call was requested to be placed in Call Answer switch Supervision state or Suppressed Call Answer Supervision state.

The low level functionality described may be implemented at a higher level by implementing software control through programmable functions. In a Network Service creation environment on the IP (14), programmable elements can be linked together to create an application or a service. One example of this might be:

AnswerCall
PlayMessage(Thank you for calling but no services are available)
EndCall In this instance the application answers a call creating a call billing record with the AnswerCall action as in known methods. The Answercall action invokes the ISDN Connect message to be sent to the SSP (10). This directs the signalling to change state and accept the call and send a call accept event to the switch. The application then plays a network information message to the caller, and will end the call by issuing the EndCall event which directs the signalling to change state and send a call clear event to the switch.

The call billing record is created in the switch/SSP when the call is answered by the IP (14). The switch should enter the 'Call Answer Supervision' state and the full call duration is charged.

A new program instruction according to an embodiment of the invention could be made available to a Network Provider Service Creation Utility and provide access to the functionality of Call Answer Supervision Suppression irrespective of the underlying protocol. In this example it may be called: 'ConnectCallSuppressACS' or 'ConnectCallDoNotCharge'. The new action could invoke the Progress Message with Progress Indicator=8, for example:

ConnectCallDoNotCharge
PlayMessage(Thank you for calling but no services are available)
EndCall In this instance the application partially answers a call without creating a call billing record with the first action. This directs the signalling to change state and send a call partial accept event to the switch.

The application then plays a network information message to the caller and will end the call by issuing the EndCall event which directs the signalling to change state and send a call clear event to the switch.

Other services are described as follows.

a) Call Redirect via the IP (14) without charge. This application can mimic services which may be available in the switch and need not be charged, but without ACS suppression support if the IP (14) were to implement it, the redirection would be charge to the caller. With ACS Suppression support:

ConnectCallDoNotCharge
GetRedirectNumber
PlayMessage(Please wait while your call is being redirected)
TransferCall (New number)

No billing record is generated in this case.

b) Play Network Information on cellular Phone status without charge. This application can mimic services which may be available in the switch and need not be charged, but without ACS suppression support if the IP (14) were to implement it, the message would be charged. If the call is routed to the IP (14) or VRU just to play the network message:

ConnectCallDoNotCharge
PlayMessage(The cellular phone you called was switched off)
EndCall c) Play Network Information on cellular Phone status without charge and Optionally Charge if Caller wishes to receive messages. If the IP/VRU can check on the status of the Cellular phone and its messaging service then the following application could be implemented;

ConnectCallDoNotCharge
CELL_QueryCellphoneStatus
If(CellPhoneStatus==OFF)
CELL_QueryMessageservice
If(CellMessageServiceAvailable==NOT AVAILABLE
    PlayMessage(The cellular phone you called was switched off)
else
    AnswerCall(create billing record and start charging for call)
    PlayMessage(This is Mr . . . )
    PlayMessage(Please leave a message after the tone)
    PlayTone
    RecordMessage
else
    CELL_RouteCall ToPhone
EndCall No billing record is generated in these cases where (i) the phone is turned off and there is no message service available or not subscribed to; or (ii) the cellular phone is turned on.

However if the phone was turned off, but the message service was available the service creator has the option of starting to charge for the call by issuing the "AnswerCall" action and then playing an information message followed by a recording of the message.

d) Play a Network Information Message back to a caller specifying whether they have any VoiceMail Messages or not. This response could be provided free of charge. However if the caller wished to receive their messages the charging could be started:

```
ConnectCallDoNotCharge
PlayMessage(Enter pin number please)
GetDigits
Id=IdDataBaseQuery(digits)
if (Id not VALID)
    Go back and ask for pin number unless 3 attempts have
        failed
else
    CurrentMessages=MessageDatabaseQuery( )
    if(CurrentMessages==NONE)
        PlayMessage(You have no messages)
        PlayMessage(Do you want to use any other services
            1 for YES)
        GetLDigits
        If (Digit=1)
        AnswerCall
        . . .
        EndCall
    else
        PlayMessage(You have xx messages)
        PlayMessage(Would you like to hear them. Press 1
            for YES)
        GetDigits
        If (Digits not==1)
        EndCall
    else
        AnswerCall
        . . .
        EndCall
```

No billing record is created in the above application unless the caller has a message and wants to listen to it, or the caller has no messages but wants to work with some other facility of the voicemail system like their personal message played to callers.

e) Decide whether to charge the call based on the Called Number.

This could be implemented in two ways. Either the intelligent router in the network ie Signalling Control Point (SCP) or Intelligent SCP (ISCP) routes the call to an application which determines whether to charge for the call after it reads the Called Number, OR it passes the Called Number to the IP (14) which analyses the Called Number, determining whether to charge for the call, and routes it to an appropriate application.

Handling the first example the application would be as follows:

```
ConnectCallDoNot Charge
PlayMessage(Welcome to . . . service)
. . .
EndCall
```

If the IP (14) had to check the Called Number the application may be structured:

```
ConnectCallDoNotCharge
GetCalledNumber
Service_Query=DataBaseQueryService(Called_
    Number)
If(Service_Query==CHARGE_FOR_CALL)
    AnswerCall
    PlayMessage(Welcome to the . . . service)
    . . .
EndCall
```

No billing record is created if the Service Enquiry to the database returned specifying the call was not to be charged.

f) Decide whether to charge the call based on the Calling Number.

This could prove useful if a service could be either subscribed to by an annual or monthly fee, OR, could be charged to the caller on a call by call basis.

```
ConnectCallDoNotCharge
GetCallingNumber
Service_Query=QueryDataBaseService(Calling_
    Number)
if(Service_Query==CHARGE_FOR_CALL)
    AnswerCall
    PlayMessage(Welcome to . . . service)
    . . .
EndCall
``` g) Decide whether to charge call dependent on the time of day or the day of the week.

Some applications could be charged at certain times of the day and not at other, and some applications could be charged on certain days during the week, but not on others. The decision may be a combination of both time and day of the week.

```
ConnectCallDoNotCharge
Current_Time=TimeQuery( )
if(Current_Time between 9 am and 6 pm)
    AnswerCall
    PlayMessage(Welcome to . . . service)
    . . .
EndCall
```

No billing record is created if the time is after 6 pm and before 9 am in the morning.

```
ConnectCallDoNotCharge
Current_Day=DayQuery( )
if(Current_Day=Saturday or Sunday)
    AnswerCall
    PlayMessage(Welcome to the . . . service)
    . . .
EndCall
```

No billing record is generated for calls from Monday to Friday, but the service is charged on Saturday and Sunday.

h) Add callers into an ACD Queue in the IP (14), but do not charge call.

This application can mimic services which may be available in the switch and need not be charged, but without ACS suppression support if the IP (14) were to implement it, the queue wait would be charged.

Normally ACD queuing is implemented in the switch or ADC PABX. However, some older switches and some Central Office switches do not support this function. By transferring the incoming call in the switch to the IP/VRU the ACD queuing can be implemented there. When the call reaches the front of the queue, it can be transferred to the appropriate agent or service line when they become available. With ACS support:

```
ConnectCallDoNotCharge
ACD_AddCallerToQueue
ACD_CalculateWaitTime
PlayMessage(Your call is being processed in turn)
PlayMessage(Your estimated wait time is xxxx seconds)
ACD_WaitTillCallReadyToTransfer
ACD_TransferCallToAgent
EndCall
```

No billing record is generated in this case.

Clearly if the progress indicator is another value (defined in the future) which achieves the same result of a billing record not being created the embodiment can be adapted.

Such an embodiment would still achieve a connection from the peripheral device to a caller which was unsupervised and thereby not charged.

A limited number of new services are described above. A skilled person would realise that many more functions and services are possible using the principles set out here.

In summary the invention provides an intelligent peripheral (IP) for connecting to a telephone network and providing added capabilities to the network. More particularly the invention relates to programmable suppression of call answer supervision by an intelligent peripheral or a voice recognition unit in a telephone network. The method comprises the steps of: the peripheral device receiving a call setup signal from a network switch when a call is being initiated, the IP (14), on receipt of the call setup signal, does not send the normal answer signal output but instead outputs a progress signal to the network switch. For an ISDN network the progress signal is a 'Progress' message with Progress Indicator PI=08 Information Element.

What is claimed is:

1. A method of suppressing the creation of a billing record by a telephone network switch under control of a peripheral device, comprising the steps of:

sending a set-up signal from the network switch to the peripheral device when the network switch is attempting to place a call;

the peripheral device sending an inband information available progress signal to the network switch to open a voice channel between the switch and the periheral device; and suppressing a connect signal by the peripheral deviced for the duration of the call to prevent the switch from creating the billing record.

2. A method as claimed in claim 1 further comprising the step of the peripheral device sending a voice message to the switch over the voice channel.

3. A method as claimed in claim 2 wherein the opened voice channel is a one way channel.

4. A method as claimed in claim 1 further comprising the step of selectively sending a connect signal from the peripheral device to the network switch whereupon the network switch initiates call answer supervision and creates a billing record for the peripheral device.

5. A method as claimed in claim 1 further comprising the step of the peripheral device sending a redirect signal to the network switch whereupon the network switch redirects the call according to the redirect message.

6. A method as claimed in claim 5 wherein the peripheral device and the switch are connected by an Integrated Services Distributed Network.

7. A method as claimed in claim 6 wherein the progress signal is the ISDN PI=08 progress indicator Information Element in a Progress Message or any other ISDN Message.

8. A method as claimed in claim 7 wherein the peripheral device is an intelligent peripheral or voice response unit.

9. A method as claimed in claim 8 wherein, under instructions from program code the peripheral device selectively sends the progress signal for suppressing call answer supervision or alternatively sends the connect signal to the network for initiation of call answer supervision.

10. A method as claimed in claim 9 wherein for a first part of the call the billing record is suppressed and for a second part of the call the billing record is generated.

11. A method as claimed in claim 10 whereby a first program code segment suppresses call answer supervision and a second program code segment allows call answer supervision.

12. A method as claimed in claim 10 further comprising the step of controlling whether call answer supervision is suppressed or non-suppressed.

13. A peripheral device for connection to a telephone network switch in a telephone network comprising;

means for receiving a set-up message from the telephone network switch when the switch is attempting to place a call; and means for sending an inband information available progress signal to the network switch and suppressing sending a connect signal for the duration of the call; whereby the network switch will suppress call answer supervision of the peripheral device after receiving the progress signal and thereby not create a billing record for the call.

14. A peripheral device as claimed in claim 13 further comprising means for suppressing an answer call signal in response to the set-up message.

* * * * *